United States Patent
Wu et al.

(10) Patent No.: US 11,809,986 B2
(45) Date of Patent: Nov. 7, 2023

(54) COMPUTING GRAPH SIMILARITY VIA GRAPH MATCHING

(71) Applicant: INTERNATIONAL BUSINESS MACHINES CORPORATION, Armonk, NY (US)

(72) Inventors: Lingfei Wu, Elmsford, NY (US); Tengfei Ma, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 785 days.

(21) Appl. No.: 16/875,919

(22) Filed: May 15, 2020

(65) Prior Publication Data
US 2021/0357746 A1    Nov. 18, 2021

(51) Int. Cl.
*G06N 20/00*    (2019.01)
*G06N 3/08*    (2023.01)
*G06N 3/045*    (2023.01)

(52) U.S. Cl.
CPC .............. *G06N 3/08* (2013.01); *G06N 3/045* (2023.01); *G06N 20/00* (2019.01)

(58) Field of Classification Search
CPC ..................................................... G06N 20/00
See application file for complete search history.

(56) References Cited

U.S. PATENT DOCUMENTS

| | | |
|---|---|---|
| 8,538,169 B2 | 9/2013 | Hido |
| 9,122,771 B2 | 9/2015 | Hido et al. |
| 2016/0055261 A1 | 2/2016 | Reinhardt et al. |
| 2019/0095472 A1 | 3/2019 | Griffith |

(Continued)

FOREIGN PATENT DOCUMENTS

| | | |
|---|---|---|
| CN | 104298990 B | 12/2017 |
| CN | 107844760 A | 3/2018 |

OTHER PUBLICATIONS

Li, et al., "Graph Matching Networks for Learning the Similarity of Graph Structured Objects," Proceedings of the 36th International Conference on Machine Learning, Jun. 2019. (Year: 2019).*

(Continued)

*Primary Examiner* — Feng-Tzer Tzeng
(74) *Attorney, Agent, or Firm* — Intelletek Law Group, PLLC; Gabriel Daniel, Esq.

(57) ABSTRACT

A computer-implemented method for calculating a similarity between a pair of graph-structured objects by learning-based techniques. The operations include computing the node embeddings of a pair of graph-structured objects of two computer graphs utilizing a hierarchical graph matching network (HGMN). A first component of the HGMN performs graph matching of global-level graph interactions of the two computer graphs. A second component of the HGMN performs graph matching of cross-level node-graph interactions of the two computer graphs. There is an aggregating of features learned from the graph matching of the global-level graph interactions and the cross-level node-graph interactions. At least one of a graph-graph classification or a graph-graph regression is performed utilizing the learned features of the two computer graphs.

17 Claims, 11 Drawing Sheets

Hierarchical Graph Matching Network

(56) References Cited

U.S. PATENT DOCUMENTS

2019/0317728 A1 10/2019 Chen et al.

OTHER PUBLICATIONS

Bai, et al., "SimGNN: A Neural Network Approach to Fast Graph Similarity Computation," WSDM Feb. 2019. (Year: 2019).*
Mell, P. et al., "Recommendations of the National Institute of Standards and Technology"; NIST Special Publication 800-145 (2011); 7 pgs.
Ling, X. et al., "Hierarchical Graph Matching Networks for Deep Graph Similarity Learning"; IDA Pro disassembler, https://www.hex-rays.com/products/ida/index.shtml (2019); 14 pgs.
Bai, Y. et al., "SimGNN: A Neural Network Approach to Fast Graph Similarity Computation"; WSDM (2019); 9 pgs.
Li, S. et al., "Graph Matching Networks for Learning the Similarity of Graph Structured Objects"; Proceedings of the 36th International Conference on Machine Learning (2019); 11 pgs.

* cited by examiner

Table 1 Summary statistics of datasets

| TASKS | DATASETS | SUB-DATASETS | No. of Graphs | No. of Functions | AVG No. of Nodes |
|---|---|---|---|---|---|
| Classification | FFmpeg | [3,200]<br>[20,200]<br>[50,200] | 83008<br>31696<br>10824 | 10376<br>7668<br>3178 | 18.83<br>51.02<br>90.93 |
| | OpenSSL | [3,200]<br>[20,200]<br>[50,200] | 73953<br>15800<br>4308 | 4249<br>1073<br>338 | 15.73<br>44.89<br>83.68 |
| | AIDS700 | — | 700 | — | 8.90 |
| Regression | LINUX1000 | — | 1000 | — | 7.58 |

Table 2: Summary of classification results in terms of AUC scores (%).

| Model | FFmpeg | | | OpenSSL | | |
|---|---|---|---|---|---|---|
| | [3, 200] | [20, 200] | [50, 200] | [3, 200] | [20, 200] | [50, 200] |
| SimGNN | 95.38±0.76 | 94.31±1.01 | 93.45±0.54 | 95.96±0.31 | 93.58±0.82 | 94.25±0.85 |
| GMN | 94.15±0.62 | 95.92±1.38 | 94.76±0.45 | 96.43±0.61 | 93.03±3.81 | 93.91±1.65 |
| SGNN (Max) | 93.92±0.07 | 93.82±0.28 | 85.15±1.39 | 91.07±0.10 | 88.94±0.47 | 82.10±0.51 |
| MPNGMN | 97.73±0.11 | 98.29±0.21 | 96.81±0.96 | 96.56±0.12 | 97.60±0.29 | 92.89±1.31 |
| HGMN (FCMax) | 98.07±0.06 | 98.29±0.10 | 97.83±0.11 | 96.87±0.24 | 97.59±0.24 | 95.58±1.13 |
| HGMN (BiLSTM) | 97.56±0.38 | 98.12±0.04 | 97.16±0.53 | 96.90±0.10 | 97.31±1.07 | 95.87±0.88 |

FIG. 6

Table 3: Summary of regression results on AIDS700 and LINUX1000.

| Datasets | Model | mse ($10^{-3}$) | $\rho$ | $\tau$ | p@10 | p@20 |
|---|---|---|---|---|---|---|
| AIDS700 | SimGNN | 1.376±0.066 | 0.824±0.009 | 0.665±0.011 | 0.400±0.023 | 0.489±0.024 |
|  | GMN | 4.610±0.365 | 0.672±0.036 | 0.497±0.032 | 0.200±0.018 | 0.263±0.018 |
|  | SGNN (Max) | 2.822±0.149 | 0.765±0.005 | 0.588±0.004 | 0.289±0.016 | 0.373±0.012 |
|  | MPNGMN | 1.191±0.048 | 0.904±0.003 | 0.749±0.003 | 0.465±0.011 | 0.538±0.007 |
|  | HGMN (FCMax) | 1.205±0.039 | 0.904±0.002 | 0.749±0.003 | 0.457±0.014 | 0.532±0.016 |
|  | HGMN (BiLSTM) | 1.169±0.036 | 0.905±0.002 | 0.751±0.003 | 0.456±0.019 | 0.539±0.018 |
| LINUX 1000 | SimGNN | 2.479±1.038 | 0.912±0.031 | 0.791±0.046 | 0.635±0.328 | 0.650±0.283 |
|  | GMN | 2.571±0.519 | 0.906±0.023 | 0.763±0.035 | 0.888±0.036 | 0.856±0.040 |
|  | SGNN (Max) | 11.832±0.698 | 0.566±0.022 | 0.404±0.017 | 0.226±0.106 | 0.492±0.190 |
|  | MPNGMN | 1.561±0.020 | 0.945±0.002 | 0.814±0.003 | 0.743±0.085 | 0.741±0.086 |
|  | HGMN (FCMax) | 1.575±0.627 | 0.946±0.019 | 0.817±0.034 | 0.807±0.117 | 0.784±0.108 |
|  | HGMN (BiLSTM) | 0.439±0.143 | 0.985±0.005 | 0.919±0.016 | 0.955±0.011 | 0.943±0.014 |

FIG. 7

COMPUTING GRAPH SIMILARITY VIA GRAPH MATCHING

STATEMENT REGARDING PRIOR DISCLOSURES BY THE INVENTOR OR A JOINT INVENTOR

Ling, Xiang et al., "Hierarchical Graph Matching Networks for Deep Graph Similarity Learning," Sep. 25, 2019, available at https://openreview.net/forum?id=rkeqn1rtDH.

BACKGROUND

Technical Field

The present disclosure generally relates to the learning of general similarity metrics between graph-structured objects. More particularly, the present disclosure relates to a system and method for computing a graph similarity between arbitrary pairs of graph-structured objects.

Description of the Related Art

Graph Neural Networks (GNN) are a class of deep learning methods that are operative in a graph domain. The machine learning of a general similarity metric between arbitrary pairs of graph-structured objects in Graph Neural Networks (GNN) can be applied to a wide variety of applications.

SUMMARY

According to various embodiments, there is a computer-implemented method for calculating a similarity between a pair of graph-structured objects by learning-based techniques, the method includes computing node embeddings of the pair of graph-structured objects of two computer graphs by utilizing a hierarchical graph matching network (HGMN). A first component of the HGMN performs graph matching of global-level graph interactions of the two computer graphs. A second component of the HGMN performs graph matching of cross-level node-graph interactions of the two computer graphs. Features learned from the graph matching of the global-level graph interactions and the cross-level node-graph interactions are aggregated. At least one of a graph-graph classification or a graph-graph regression is performed utilizing the learned features of the two computer graphs.

In an embodiment, the method includes performing the graph matching of global-level graph interactions by assessing graph-graph interactions, and performing the graph matching of cross-level node-graph interactions by assessing node-graph interaction. The learning-based techniques is a deep-learning method.

In an embodiment, the first component of the HGMN that performs graph matching of global-level graph interactions of the two computer graphs includes a Siamese Graph Neural Network (SGNN) configured for learning the global-level interactions.

In an embodiment, the SGNN includes a multi-layer Graph Convolution Network (GCN), and the method includes computing the node embeddings of the two computer graphs by a node embedding layer of the GCN. There is an aggregating of the computed node embeddings and a formulating of corresponding graph-level embeddings of each graph of the two computer graphs by a graph-level embedding aggregation layer of the GCN. A graph similarity score of the two graphs is computed by a graph-graph matching and a prediction layer of the GCN.

In an embodiment, the second component of the HGMN that performs graph matching of cross-level node-graph interactions of the two computer graphs includes a multi-perspective Node-Graph Matching Network (NGMN) configured for learning the cross-level node-graph interactions of the one or more computer graphs.

In an embodiment, the NGMN includes a plurality of node embedding layers and one or more node-graph matching layers, and the method includes computing node embeddings for each node of the node embedding layers. There is a calculating graph-level embedding of a graph of the two graphs of the node-graph matching layers, and comparing the node embeddings of the graph with an associated graph-level embedding of a whole graph, and producing a similarity feature vector.

In an embodiment, the NGMN includes a plurality of aggregation layers, and the method further includes: aggregating feature embeddings of the node-graph matching layers, computing a similarity score based on cosine or sigmoid similarity of the aggregated features, and determining a predicted similarity score. The aggregating feature embeddings of the node-graph matching layers is performed by using a commutative aggregator.

In one embodiment, a system for calculating a similarity between a pair of graph-structured objects by learning-based techniques, the system includes a processor configured to perform deep graph similarity learning. A memory is coupled to the processor, the memory storing instructions to cause the processor to perform acts including computing a node embedding of the pair of graph-structured objects of two computer graphs utilizing a hierarchical graph matching network (HGMN). There is a performing of a graph matching of global-level graph interactions of the two computer graphs by a first component of the HGMN, and a performing a graph matching of cross-level node-graph interactions of the two computer graphs. Features learned from the graph matching of the global-level graph interactions and the cross-level node-graph interactions are aggregated. There is a performing of at least one of a graph-graph classification or a graph-graph regression utilizing the learned features of the two computer graphs or a graph-graph regression utilizing the learned features of the two computer graphs.

In one embodiment, a non-transitory computer readable storage medium tangibly embodying a computer readable program code having computer readable instructions that, when executed, causes a computer device to perform a method of calculating a similarity between a pair of graph-structured objects by learning-based techniques, the method includes computing node embedding of the pair of graph-structured objects of two computer graphs utilizing a hierarchical graph matching network (HGMN). A first component of the HGMN performs graph matching of global-level graph interactions of the two computer graphs. A second component of the HGMN performs graph matching of cross-level node-graph interactions of the two computer graphs. The features learned from the graph matching of the global-level graph interactions and the cross-level node-graph interactions are aggregated. There is a performing of at least one of a graph-graph classification or a graph-graph regression by utilizing the learned features of the two computer graphs.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 6 illustrates is a second table showing a showing a summary of classification results in terms of Area Under Curve (AUC) scores by percentage, consistent with an illustrative embodiment.

FIG. 7 illustrates a third table showing a, summary of regression results on datasets consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

According to the present disclosure, a Hierarchical Graph Matching Network (HGMN) computes the graph similarity between any pair of graph structured objects. In an illustrative embodiment, the HGMN model jointly learns graph representations and a graph matching metric function for computing graph similarity in an end-to-end fashion. As disclosed herein, a node-graph matching network effectively captures the cross-level interactions between a node embedding of a graph and a corresponding attentive graph-level embedding of another graph.

In an illustrative embodiment, there is provided a graph matching function that includes learning a mapping between a pair of graph inputs and determining a similarity score ($y \in Y$). For example, for the following pair of graphs G1, G2, a similarity score ($y \in Y$) can be determined for both a graph-graph classification task, and a graph-graph regression task. The similarity score can be based on, for example, a graph topology A, a set of a node attribute information V, and a set of embedded nodes X in which $X^1$ and $X^2$ denote the initial node attributes for G1 and G2 as each node has a vector representation for its node attribute and, the similarity score as shown herein below:

Input: a pair of graph inputs $(G^1, G^2) \in G \times G$,
  $G^1 = (V^1, E^1)$ with $(X^1, A^1)$, where $X^1 \in R^{N \times d}$, $A^1 \in R^{N \times N}$
  $G^2 = (V^2, E^2)$ with $(X^2, A^2)$, where $X^2 \in R^{M \times d}$, $A^2 \in R^{M \times M}$ Output: a similarity score $y \in Y$
  $Y = \{-1, 1\}$: graph-graph classification task;
  $Y = [0, 1]$: graph-graph regression task.

In the output, with regard to the similarity score, a 1 is most similar, and a 0 is not similar for the underlying task (e.g., a classification task or a regression task).

The computer-implemented method and system for computing graph similarity according to the present disclosure provides an improvement in fields such as machine learning, and a wide variety of applications including but not limited to malware detection, text matching and entailment in natural language processing, and knowledge graph question answering. In addition, the computer-implemented system method provides for an improvement in the efficiency of computer operations. For example, there can be an increased accuracy in machine learning that can result in reduce the amount of processing power and storage considerations used.

Example Architecture

Figure 1:
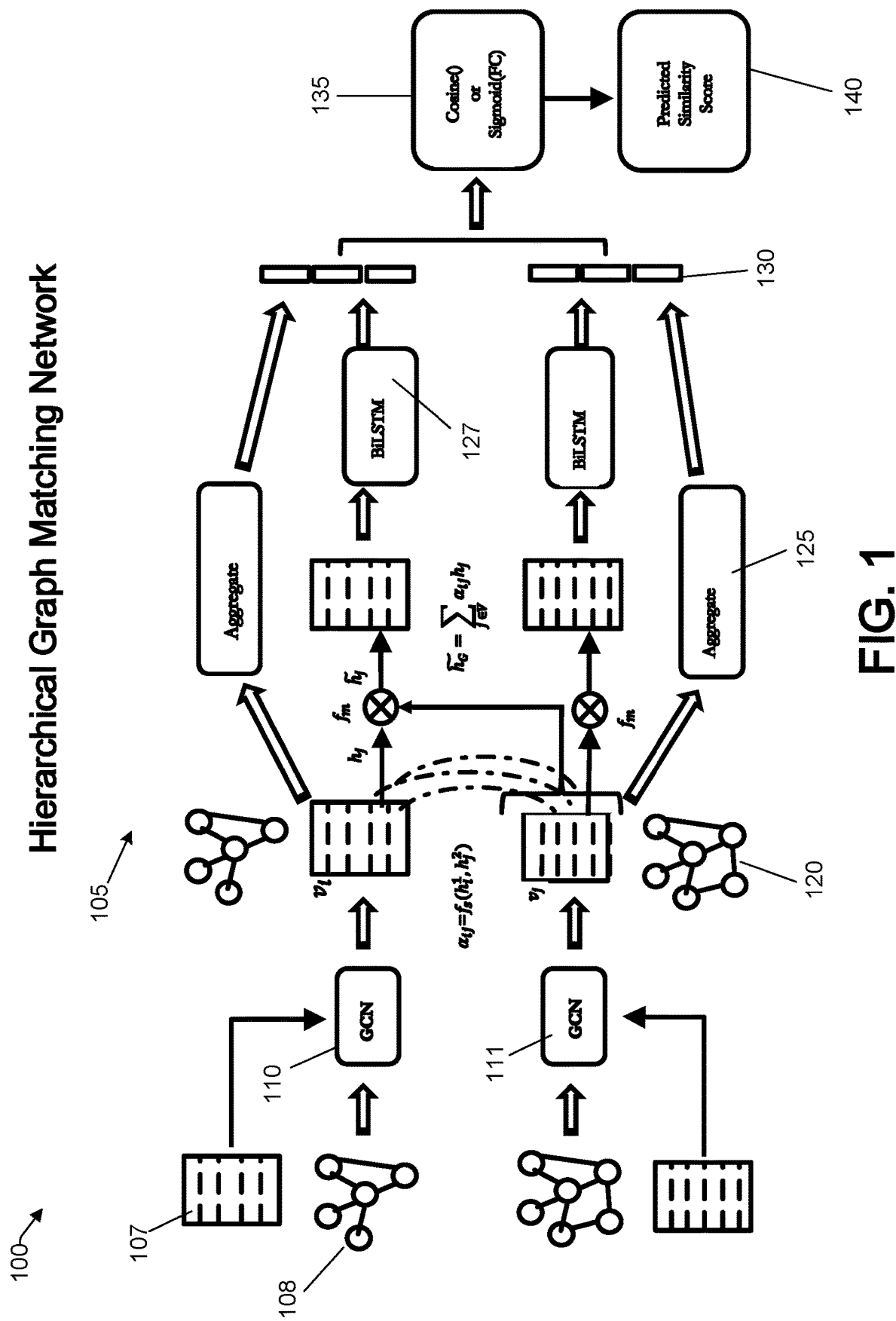
FIG. 1 is a diagram providing an overview of a model Architecture of a Hierarchical Graph Match Network (HGMN), consistent with an illustrative embodiment.

FIG. 1 is a diagram 100 providing an overview of a model Architecture of a Hierarchical Graph Match Network (HGMN) 105 consistent with an illustrative embodiment. The HGMN 105 includes a Siamese Graph Neural Network (SGNN) shown in FIG. 2, and a Multi-Perspective Node-Graph Matching Network (NGMN) shown in FIG. 3. The HGMN captures different level interactions. For example, in FIG. 1, the SGNN is configured for learning the global-level interactions, whereas the NGMN is configured for learning the cross-level node-graph interactions.

Figure 2:
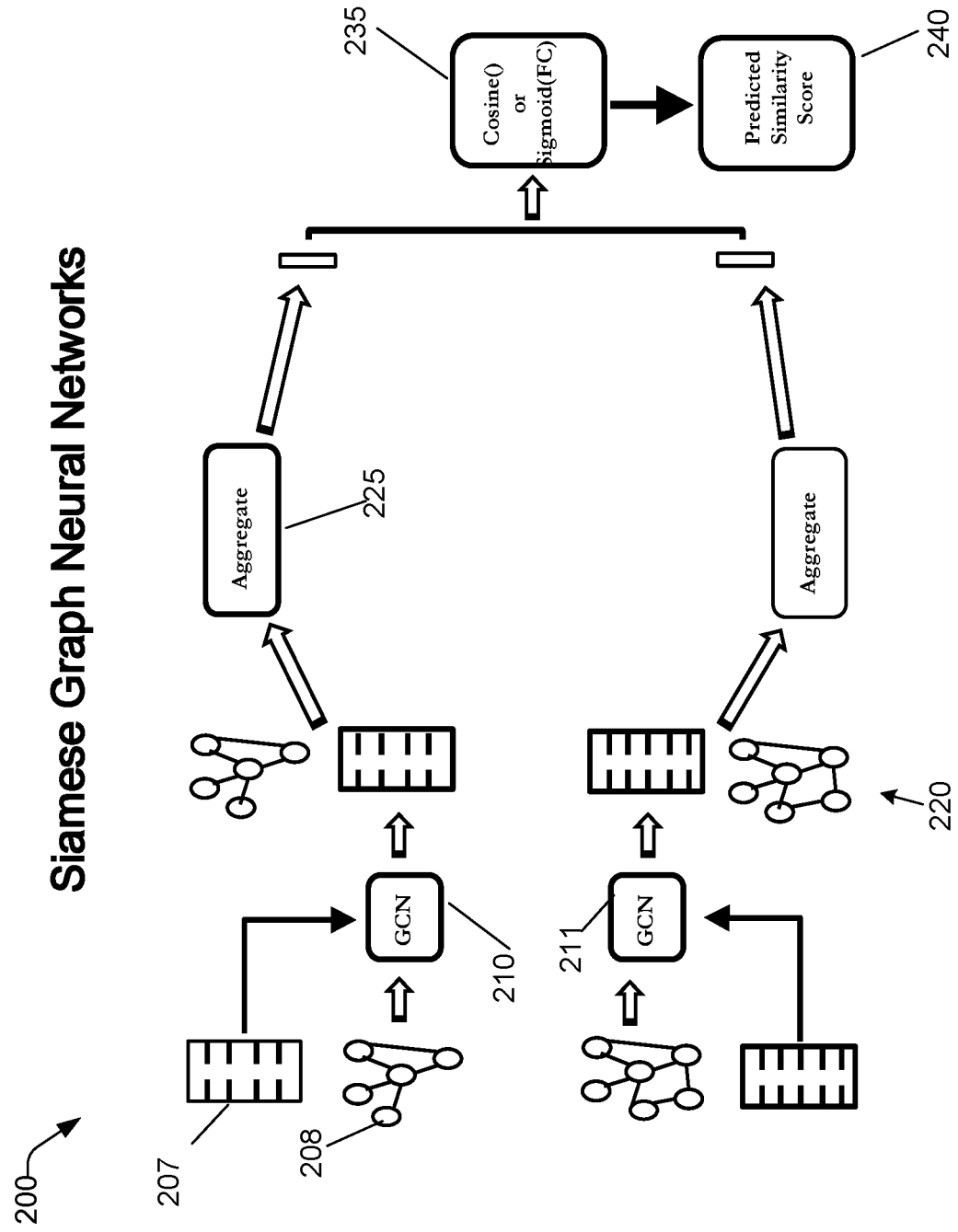
FIG. 2 illustrates a Siamese Graph Neural Network (SGNN), consistent with an illustrative embodiment.

The SGNN 200 shown in FIG. 2 is represented in FIG. 1 by at least the GCNs 110, 111, the aggregate modules 125, and cosine or sigmoid module 135 and predicted similarity score module 140.

Figure 3:
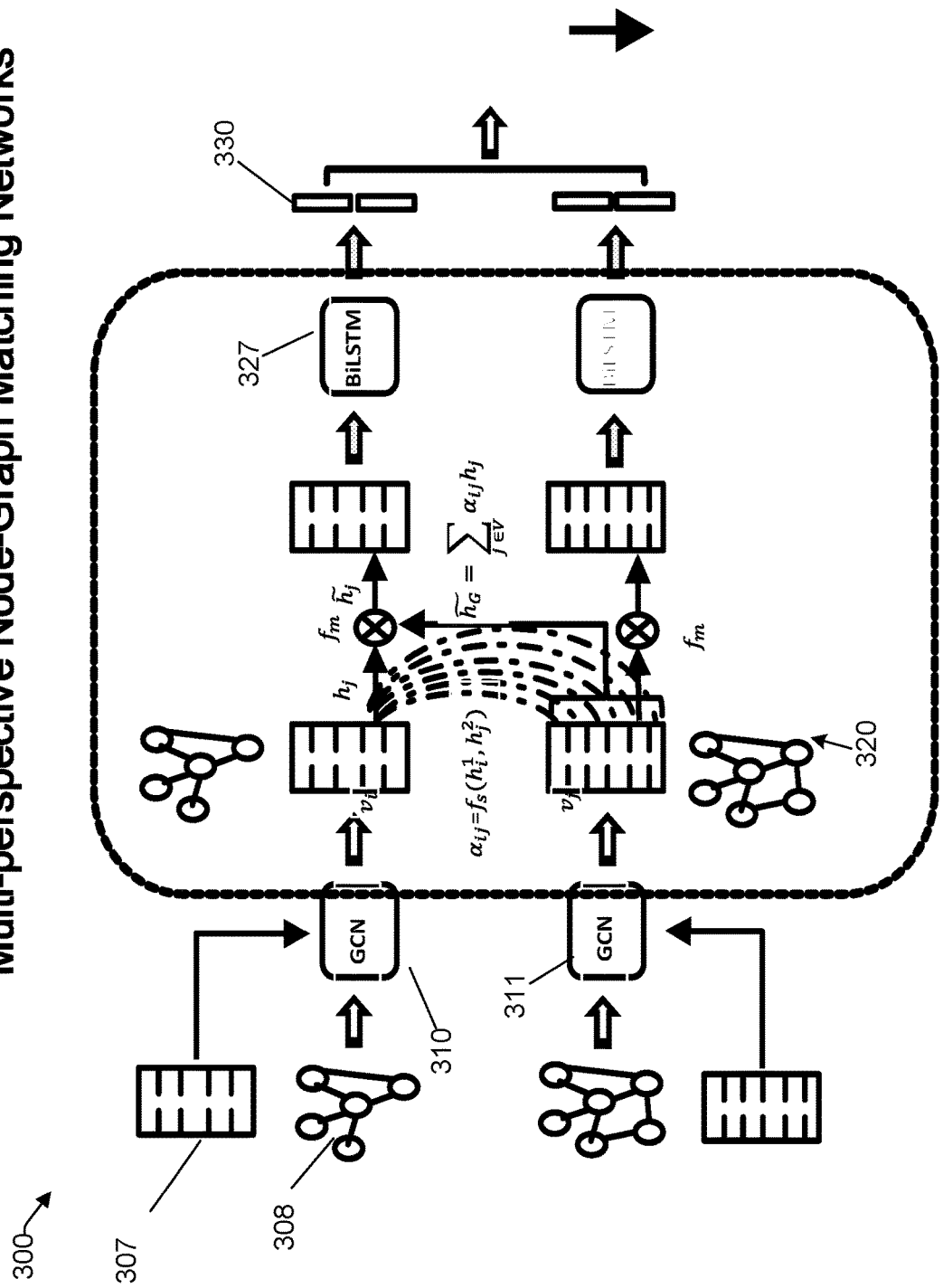
FIG. 3 illustrates a multi-perspective Node-Graph Matching Network, consistent with an illustrative embodiment.

The NGMN 300 shown in FIG. 3 represented in FIG. 1 by at least the GCN's 110, 111, the adders 122, and the Bi-directional Long Short Term Memory (BiLSTM) aggregators 127. While for example, the same GCNs 110, 111 shown in FIG. 1 are utilized by both the SGNN 200 of FIG. 2 and the NGMN 300 of FIG. 3, this configuration is provided for illustrative purposes and each of the SGNN 200 and the NGMN 300 may have dedicated GCNs With continued reference to FIG. 1, the HGMN 105 includes data sets 107 that are input to Graph Convolution Networks (GCN) 110, 111. The inputs may be datasets 107, and, for example, training models 108. The SGNN part of the HGMN performs functions using the GCNs 110,111. However, it is to be understood that while GCNs 110,111 are shown, other variants of Graphical Neural Networks such as GraphSAGE and Gated Graph Neural Networks can also be used. The SGNN includes three components shown in FIG. 1, for example, node embedding layers 120, graph-level embedding aggregation layers 125, and graph-graph matching and prediction layers 130. The cosine or Sigmoid (FC) module 135 and the predicted similarity score modules 140 can further process the output from the HGMN. Such a predictability score can provide greater accuracy in a variety of applications.

FIG. 2 illustrates a Siamese Graph Neural Network (SGNN), consistent with an illustrative embodiment. The datasets 207 may include graph structured objects, and training models 208. The structured objects may be nodes on a graph. The SGNN includes node embedding layers, graph-level embedding aggregation layers, and graph-graph matching and prediction layers. The GCN's 110, 111 can be multilayer GCNs to compute (e.g. generate) the node embeddings, and the number of GCN layers utilized can be set according to the real application graph data.

After the SGNN 200 computes the node embeddings for each graph, an aggregation of the resulting node embeddings is used to formulate corresponding graph level embeddings of each graph. Various aggregation functions can be utilized including but not limited to a Long Short-Term Memory (LSTM) aggregator.

After graph-level embeddings are computed for the two graphs, the resulting graph embeddings can be used to compute a graph similarity score. For example, cosine similarity may be employed as it is often employed in classification tasks. Thus, the cosine similarity of two graph-level embeddings can be computed. However, in the case of regression tasks, as they are often set in the range of [0,1], the aggregated graph embeddings can be concatenated, and then perform a sigmoid function so that similarity score is in the range of [0, 1].

FIG. 3 illustrates a multi-perspective Node-Graph Matching Networks (NGMN), consistent with an illustrative embodiment. Through the use of the NGMN and the SGNN, both the global-level interactions and the cross-level interactions are considered to provide a more accurate similarity score.

The NGMN 300 may include node embedding layers 320, node-graph matching layers 325, aggregation layers 327, and prediction layers. It can be seen that the NGMN 300 is the middle portion of the HGMN shown in FIG. 1, as well as the datasets 307, training models 308 and GCNS 310, 311, BiLSTM aggregators 327, and graph embedding 330.

The NGMN 300 performs node embedding to learn the cross-level interactions between parts of a graph and a whole graph. For example, the NGMN can calculate the graph-level embedding of a graph, and compare the node embeddings of a graph with associated graph-level embeddings of a whole graph to produce similarity feature vector.

With continued reference to FIG. 3, the aggregation layers can employ BiLSTM aggregators 327 to aggregate the unordered feature embeddings. After the aggregated graph embeddings are obtained, the embeddings of the two graphs can be used to obtain a similarity score. The same prediction layers such as shown in FIG. 1 can be used to predict the similarity score.

Figure 4:
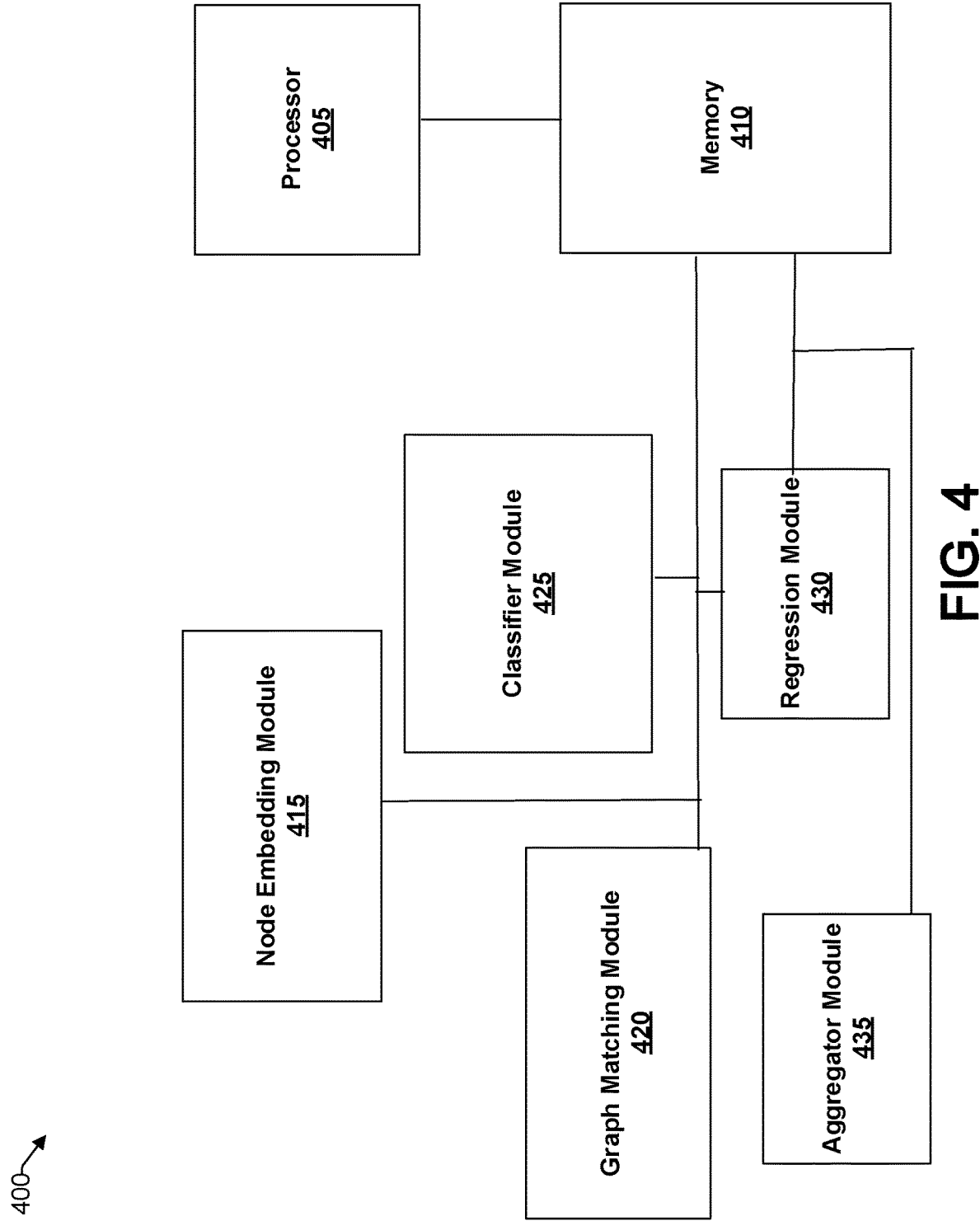
FIG. 4 illustrates logical and functional block diagrams of a system for calculating a similarity between a pair of graph-structured objects by learning-based techniques, consistent with an illustrative embodiment.

FIG. 4 illustrates logical and functional block diagrams of a system for calculating a similarity between a pair of graph-structured objects by learning-based techniques, consistent with an illustrative embodiment. A processor 405 is configured to execute instructions stored in a memory 405. While the logical representations are shown for ease of understanding, it is to be understood that there is no requirement to a number and type of modules. The node embedding module 415 includes instructions to configure the process to perform node embedding of the graphs to be analyzed for similarity. The graph matching module 420, classifier module 425, regression module 430, and aggregator module 435 all include instructions for the processor to execute and perform the operations as discussed herein above.

Figure 5:
FIG. 5 is a first table showing summary statistics of datasets, consistent with an illustrative embodiment.

FIG. 5 is a first table (Table 1) showing summary statistics of datasets, consistent with an illustrative embodiment. A model is evaluated to detect the similarity between two binary functions for illustrative purposes. There are graphs of FFmpeg and OpenSSL datasets compared by graph matching according to the present disclosure. The graph matching, according to the present disclosure can take into account the size of the graphs and its effect on performance. By splitting the datasets into subsets according to a size range of graph pairs, more accurate results can be obtained. Regression datasets are also evaluated as shown in Table 1.

FIG. 6 is a second table a summary of classification results in terms of Area Under Curve (AUC) score by percentage, consistent with an illustrative embodiment. It can be seen in FIG. 6 (utilizing the datasets of FIG. 5) that the NGMN and HGMN consistently outperform other types of models in classification tasks in terms of AUC scores by percentage.

FIG. 7 illustrates a third table showing a summary of regression results on datasets, consistent with an illustrative embodiment. It can be seen that the HGMN and NGMN provide superior results than other models used to perform regression tasks on the same datasets.

Example Processes

Figure 8:
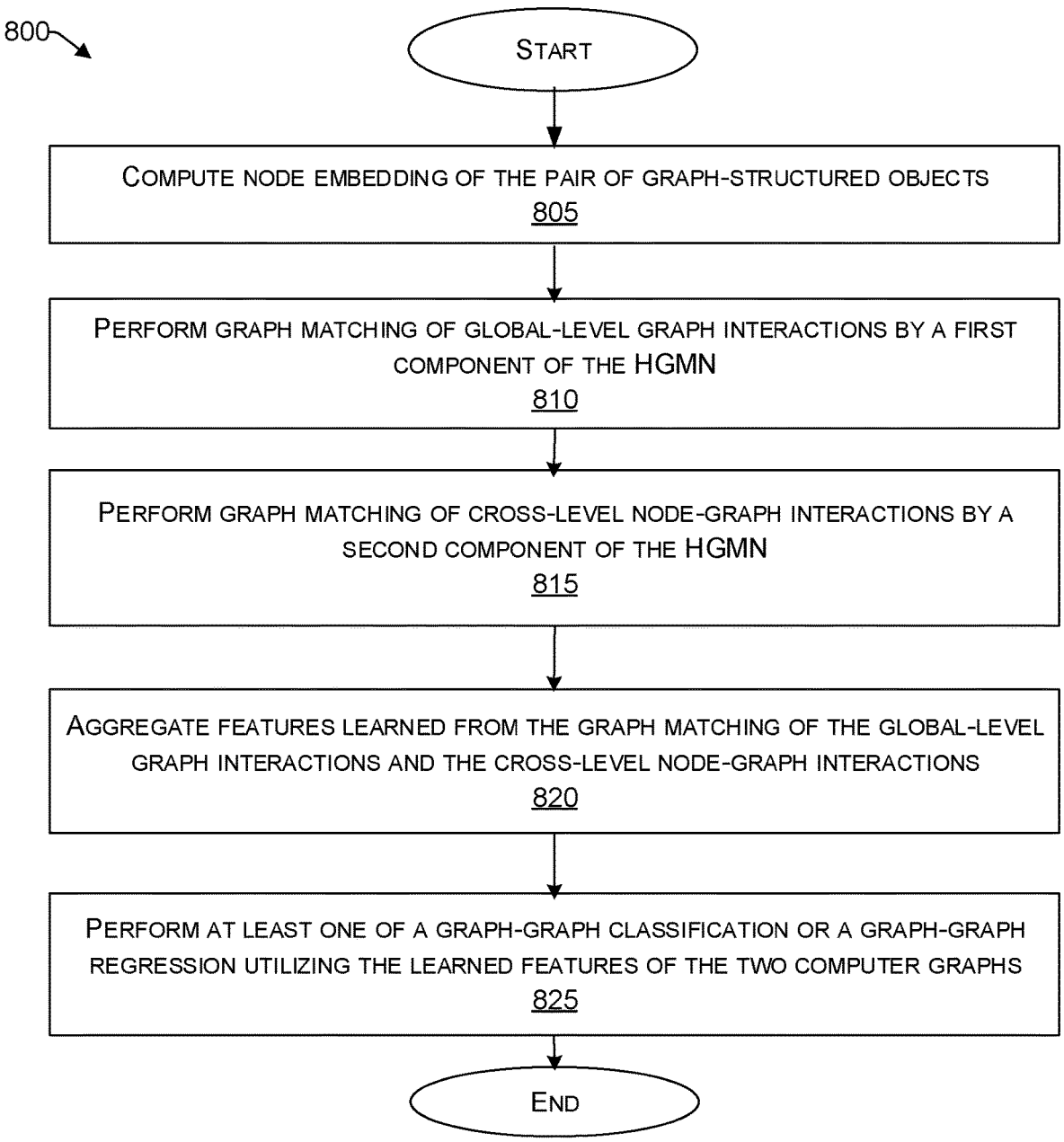
FIG. 8 is a flowchart of computer-implemented method, consistent with an illustrative embodiment.

With the foregoing overview of the example architecture, it may be helpful now to consider a high-level discussion of example processes. To that end, in conjunction with FIGS. 1, 2, 3, and 4, FIG. 8 is a flowchart 800 for a computer-implemented method, consistent with an illustrative embodiment. More particularly, FIG. 8 is a flowchart 800 of a computer-implemented method for calculating a similarity between a pair of graph-structured objects, consistent with an illustrative embodiment.

At operation 805, a computing node embedding of a pair of graph structured objects of two computer graphs is performed by utilizing a hierarchical graph matching network (HGMN) such as shown in FIG. 1.

At operation 810, a first component (e.g., an SGNN shown in FIG. 2) of the HGMN performs graph matching of global-level interactions of the graph structured objects of two computer graphs.

At operation 815, a second component (e.g., an NGMN shown in FIG. 3) of the HGMN performs graph matching of cross-level node graph interactions. By performing operations 810 and 815, there is a learning of both global-level interactions of two graphs and cross-level interactions between parts of a graph and a whole graph. Feature vectors from both the global-level interactions and the cross-level interactions are aggregated to perform either graph-graph classification tasks, or graph-graph regression tasks.

At operation 820, features learned from the graph matching operations 810 and 815 are aggregated. As discussed herein, a commutative aggregator can be used to perform this operation. Examples of such aggregators include but are not in any way limited to a BiLSTM aggregator, a max aggregator, an average aggregator, or an attention-based aggregator.

At operation 825, at least one of a graph-graph classification or a graph-graph regression can be performed utilizing the aggregated features of the two graphs. A predicted similarity score can be provided based on the operations illustrated in the flowchart of FIG. 8. Various types of applications can achieve greater accuracy by utilizing the operations in the flowchart.

Figure 9:
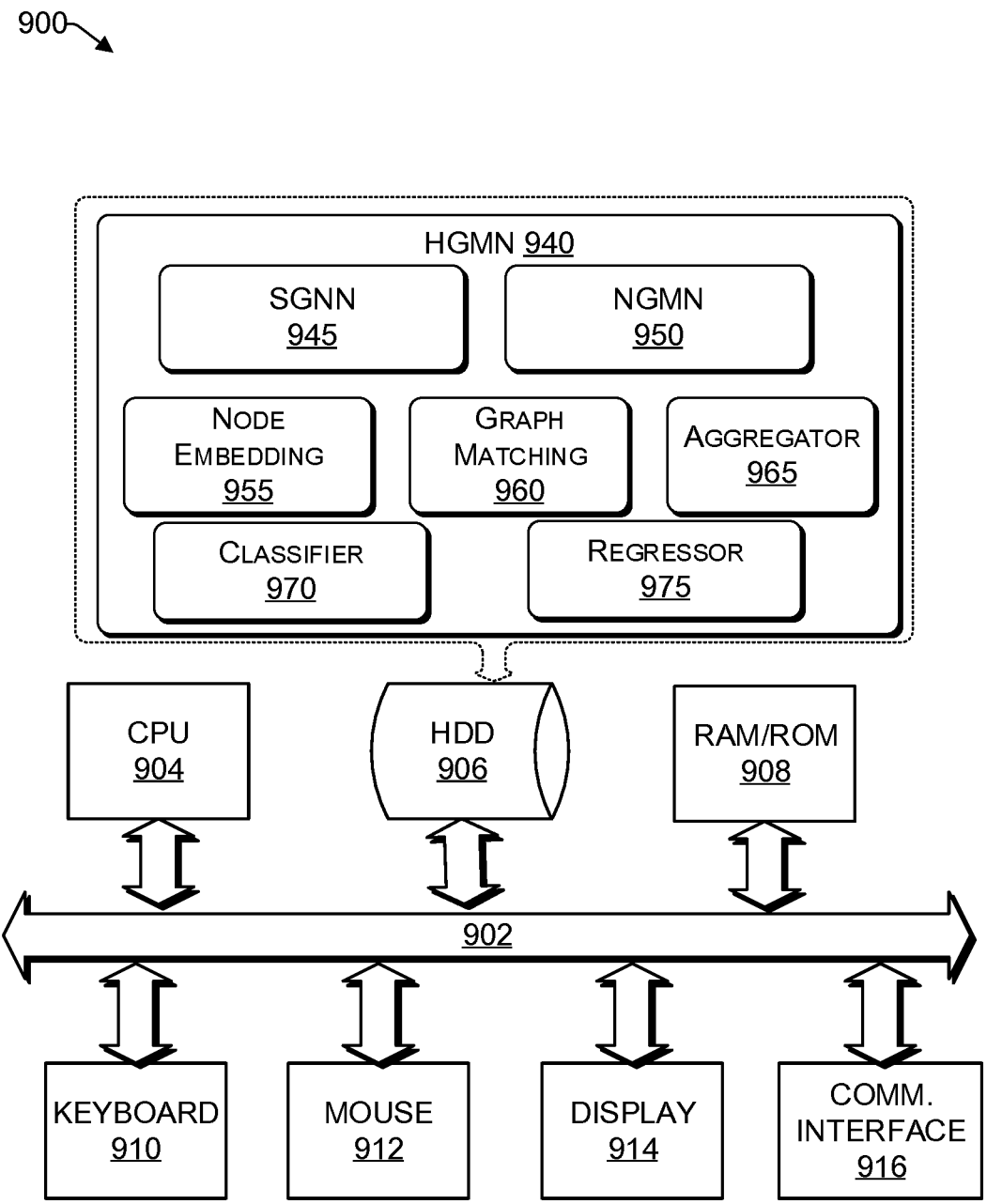
FIG. 9 is a functional block diagram illustration of a particularly configured computer hardware platform, consistent with an illustrative embodiment.

FIG. 9 provides a functional block diagram illustration of a computer hardware platform that is capable of communicating with a system as discussed herein. In particular, FIG. 9 illustrates a particularly configured network or host computer platform 900, as may be used to implement the method for leveraging simple model predictions for enhancing performance shown in FIG. 1.

The computer platform 900 may include a central processing unit (CPU) 904, a hard disk drive (HDD) 906, random access memory (RAM) and/or read-only memory (ROM) 908, a keyboard 910, a mouse 912, a display 914, and a communication interface 916, which are connected to a system bus 902. The HDD 906 can include data stores.

In one embodiment, the HDD 906, has capabilities that include storing a program that can execute various processes, such as for executing a Hierarchical Graph Matching Network (HGMN) 940, in a manner described herein. The HGMN 940 includes an SGNN 945 and an NGMN 950 configured to perform various operations to calculate graph similarity on a pair of graph-structured objects. There can be various modules configured to perform different functions that can vary in quantity.

For example, the SGNN 945 is configured to perform graph matching of global level interactions of a pair of graph-structured objects, and the NGMN 950 is configured to perform cross-level node-graph interaction of the pair of graph-structured objects. A node embedding module 955 can perform node embedding of the graph structured objects of two computer graphs, and a graph matching module is configured to perform graph matching of global-level graph interactions under direction of the SGNN 945, and to perform graph matching of cross-level node-graph interactions by the NGMN 950. An aggregator module 950 can aggregate features learned from the graph matching of the global-level graph interactions and the cross-level graph interactions. A classifier module 970 can perform graph-graph classification, and a regressor module 975 can perform a graph-graph regression utilizing the learned features of the computer graphs.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Example Cloud Platform

Figure 10:
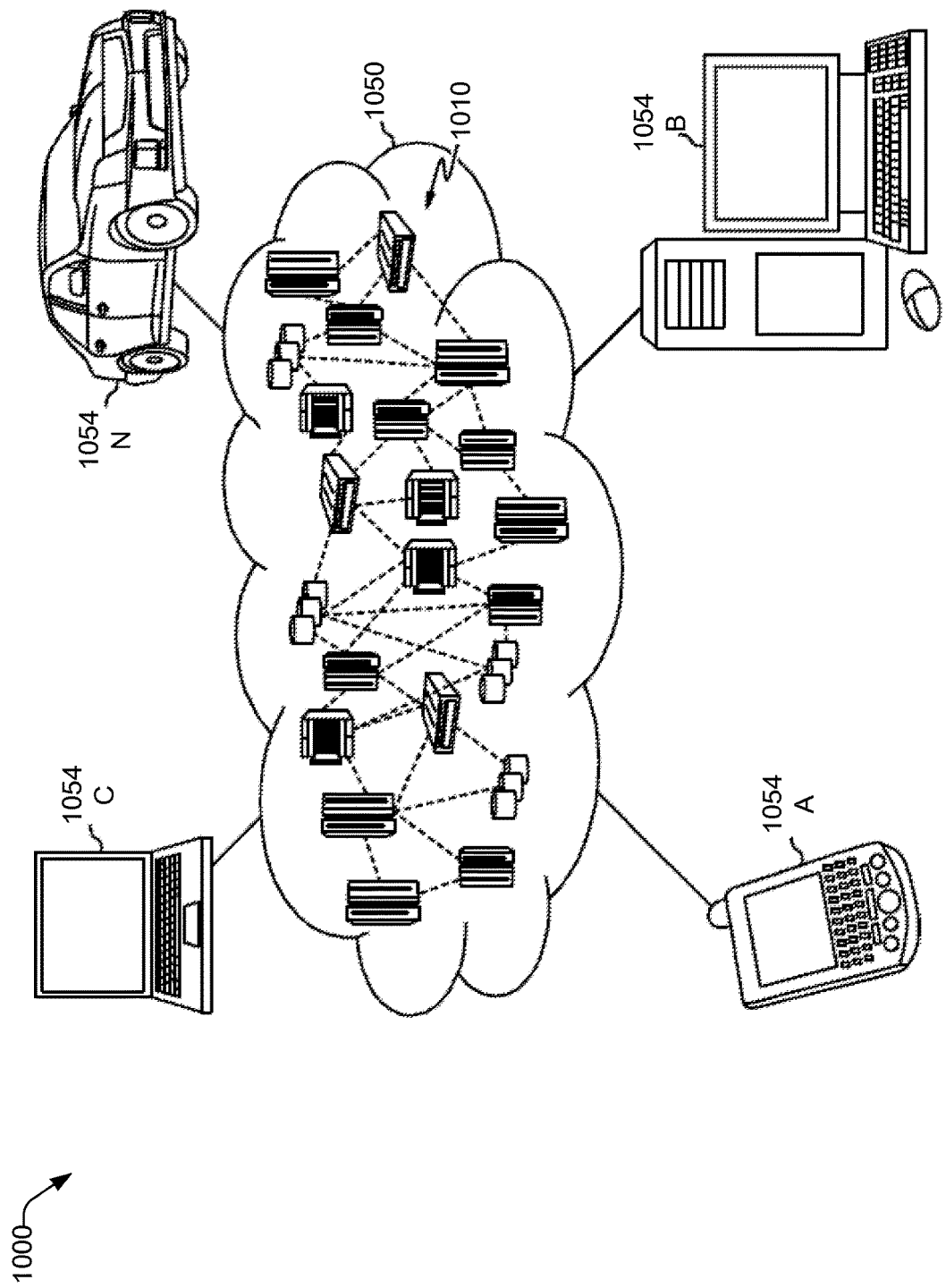
FIG. 10 depicts an illustrative cloud computing environment utilizing cloud computing.

As discussed above, functions relating to environmental and ecological optimization methods may include a cloud 1050 (see FIG. 10). It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 10, an illustrative cloud computing environment 1000 utilizing cloud computing is depicted. As shown, cloud computing environment 1000 includes cloud 1050 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms, and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
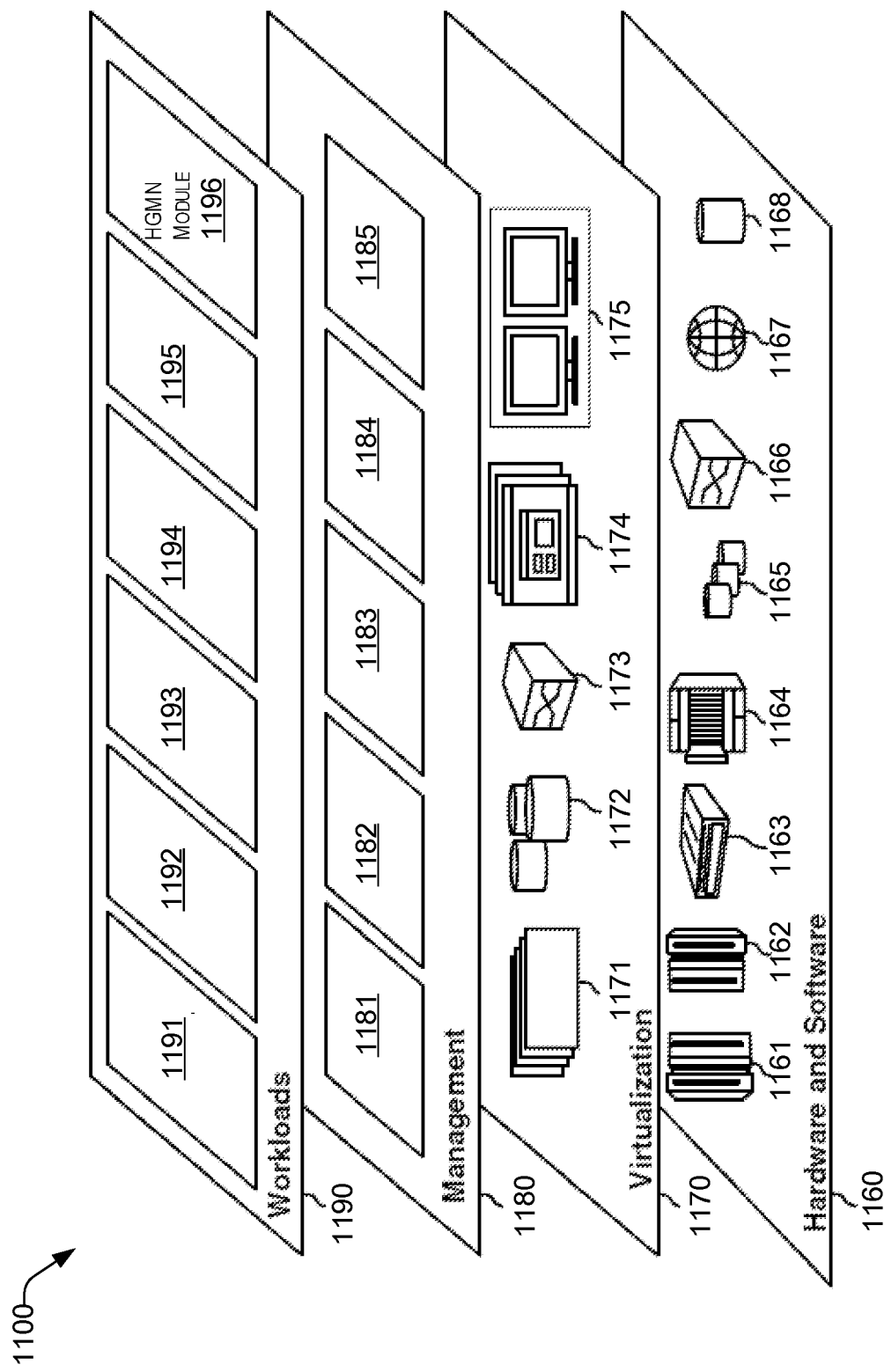
FIG. 11 depicts a set of functional abstraction layers provided by a cloud computing environment.

Referring now to FIG. 11, a set of functional abstraction layers provided by cloud computing environment 1100 (FIG. 11) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and an HGMN module 1196 to perform calculating a similarity between graph-structured objects, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for calculating a similarity between a pair of graph-structured objects by one or more learning-based techniques, the method comprising:
   computing node embeddings of the pair of graph-structured objects of two computer graphs utilizing a hierarchical graph matching network (HGMN);
   performing, by a first component of the HGMN, graph matching of global-level graph interactions of the two computer graphs;
   performing, by a second component of the HGMN, graph matching of cross-level node-graph interactions of the two computer graphs, wherein the second component comprises a multi-perspective Node-Graph Matching Network (NGMN) configured for learning the cross-level node-graph interactions of the two computer graphs;
   aggregating features learned from the graph matching of the global-level graph interactions and the cross-level node-graph interactions; and
   performing at least one of a graph-graph classification or a graph-graph regression utilizing the learned features of the two computer graphs.

2. The computer-implemented method according to claim 1, further comprising:
   performing the graph matching of the global-level graph interactions by assessing graph-graph interactions; and
   performing the graph matching of the cross-level node-graph interactions by assessing node-graph interactions, wherein the learning-based techniques comprise a deep-learning method.

3. The computer-implemented method according to claim 1, wherein the first component of the HGMN performing the graph matching of the global-level graph interactions of the two computer graphs comprises a Siamese Graph Neural Network (SGNN) configured to learn the global-level interactions.

4. The computer-implemented method according to claim 3, wherein the SGNN includes a multi-layer Graph Convolution Network (GCN), and the method further comprising:
   computing the node embeddings of the two computer graphs by a node embedding layer of the GCN;
   aggregating the computed node embeddings and formulating corresponding graph-level embeddings of each graph of the two computer graphs by a graph-level embedding aggregation layer of the GCN; and
   computing a graph similarity score of the two graphs by a graph-graph matching and prediction layer of the GCN.

5. The computer-implemented method according to claim 1, wherein the NGMN includes a plurality of node embedding layers and one or more node-graph matching layers, and the method further comprising:
   computing node embeddings for each node of the node embedding layers;
   calculating a graph-level embedding of a graph of the two graphs of the node-graph matching layers;
   comparing the node embeddings of the graph with an associated graph-level embedding of a whole graph; and
   producing a similarity feature vector.

6. The computer-implemented method according to claim 5, wherein the NGMN includes a plurality of aggregation layers, and the method further comprising:
   aggregating feature embeddings of the node-graph matching layers;
   computing a similarity score based on a cosine or a sigmoid similarity of the aggregated features; and
   outputting a predicted similarity score.

7. The computer-implemented method according to claim 6, wherein the aggregating feature embeddings of the node-graph matching layers is performed by using a commutative aggregator.

8. A system for calculating a similarity between a pair of graph-structured objects by one or more learning-based techniques, the system comprising:
   a processor configured to perform deep graph similarity learning;
   a memory coupled to the processor, the memory storing instructions to cause the processor to perform acts comprising:
   compute node embeddings of the pair of graph-structured objects of two computer graphs utilizing a hierarchical graph matching network (HGMN);
   perform, by a first component of the HGMN, graph matching of global-level graph interactions of the two computer graphs; and
   perform, by a second component of the HGMN, graph matching of cross-level node-graph interactions of the two computer graphs, wherein the second component of the HGMN comprises a multi-perspective Node-Graph Matching Network (NGMN) configured to perform graph matching of cross-level node-graph interactions of the two computer graphs;

aggregate features learned from the graph matching of the global-level graph interactions and the cross-level node-graph interactions; and perform at least one of a graph-graph classification or a graph-graph regression utilizing the learned features of the two computer graphs or a graph-graph regression utilizing the learned features of the two computer graphs.

9. The system according to claim 8, wherein the processor is further configured to:

perform the graph matching of global-level graph interactions by assessing graph-graph interactions; and perform the graph matching of cross-level node-graph interactions by assessing node-graph interactions.

10. The system according to claim 8, wherein the first component of the HGMN comprises a Siamese Graph Neural Network (SGNN) configured to perform graph matching of global-level graph interactions of the two computer graphs.

11. A non-transitory computer-readable storage medium tangibly embodying a computer-readable program code having computer-readable instructions that, when executed, causes a computer device to perform a method of calculating a similarity between a pair of graph-structured objects by one or more learning-based techniques, the method comprising:

computing node embeddings of the pair of graph-structured objects of two computer graphs utilizing a hierarchical graph matching network (HGMN);

performing, by a first component of the HGMN, graph matching of global-level graph interactions of the two computer graphs;

performing, by a second component of the HGMN, graph matching of cross-level node-graph interactions of the two computer graphs, wherein the second component of the HGMN comprises a multi-perspective Node-Graph Matching Network (NGMN) configured to learn the cross-level node-graph interactions of the two computer graphs;

aggregating features learned from the graph matching of the global-level graph interactions and the cross-level node-graph interactions; and performing at least one of a graph-graph classification or a graph-graph regression utilizing the learned features of the two computer graphs.

12. The computer-readable storage medium according to claim 11, wherein the method further comprises:

performing the graph matching of global-level graph interactions by assessing graph-graph interactions;

performing the graph matching of cross-level node-graph interactions by assessing node-graph interactions; and the learning-based techniques comprise a deep-learning method.

13. The computer-readable storage medium according to claim 12, wherein the method further comprises that the first component of the HGMN performing the graph matching of global-level graph interactions of the two computer graphs comprises a Siamese Graph Neural Network (SGNN) configured for learning the global-level interactions.

14. The computer-readable storage medium according to claim 13, wherein the SGNN includes a multi-layer Graph Convolution Network (GCN), and the method further comprises:

computing the node embeddings of the two computer graphs by a node embedding layer of the GCN;

aggregating the computed node embeddings and formulating corresponding graph-level embeddings of each graph of the two computer graphs by a graph-level embedding aggregation layer of the GCN; and computing a graph similarity score of the two computer graphs by a graph-graph matching and prediction layer of the GCN.

15. The computer-readable storage medium according to claim 11, wherein the NGMN includes a plurality of node embedding layers and one or more node-graph matching layers, and the method further comprises:

computing the node embeddings for each node of the node embedding layers;

calculating a graph-level embedding of a graph of the two graphs of the node-graph matching layers; and comparing the node embeddings of the graph with an associated graph-level embedding of a whole graph; and producing a similarity feature vector.

16. The computer-readable storage medium according to claim 15, wherein the NGMN includes a plurality of aggregation layers, and the method further comprises:

aggregating feature embeddings of the node-graph matching layers;

computing a similarity score based on cosine or sigmoid similarity of the aggregated features; and determining a predicted similarity score.

17. The computer-readable storage medium according to claim 16, wherein the method further comprises the aggregating feature embeddings of the node-graph matching layers is performed by using a commutative aggregator.

* * * * *